(12) United States Patent
Hochstetter et al.

(10) Patent No.: US 11,364,660 B2
(45) Date of Patent: Jun. 21, 2022

(54) METHOD FOR IMPREGNATING A FIBROUS MATERIAL IN AN INTERPENETRATED FLUIDIZED BED

(71) Applicant: Arkema France, Colombes (FR)

(72) Inventors: Gilles Hochstetter, Colombes (FR); Arthur Pierre Babeau, Lacq (FR); Axel Salinier, Lacq (FR); Thibaut Savart, Lacq (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 17/296,651

(22) PCT Filed: Nov. 25, 2019

(86) PCT No.: PCT/FR2019/052799
§ 371 (c)(1),
(2) Date: May 25, 2021

(87) PCT Pub. No.: WO2020/109709
PCT Pub. Date: Jun. 4, 2020

(65) Prior Publication Data
US 2022/0016807 A1  Jan. 20, 2022

(30) Foreign Application Priority Data

Nov. 26, 2018 (FR) ...................... 1871841

(51) Int. Cl.
*B29B 15/00* (2006.01)
*B29B 15/12* (2006.01)
(Continued)

(52) U.S. Cl.
CPC ............ *B29B 15/125* (2013.01); *B29B 15/14* (2013.01); *B29K 2101/12* (2013.01); *B29K 2105/10* (2013.01)

(58) Field of Classification Search
CPC ......... B29B 15/00; B29B 15/10; B29B 15/12; B29B 15/125; B29B 15/14
See application file for complete search history.

(56) References Cited

U.S. PATENT DOCUMENTS 8,640,739 B2 *  2/2014  Do ...................... F16L 11/083
138/135

FOREIGN PATENT DOCUMENTS

EP   0406067 A1   1/1991
JP   H0740341 A   2/1995
(Continued)

OTHER PUBLICATIONS

International Search Report (PCT/ISA/210) and Written Opinion (PCT/ISA/237) dated Jun. 22, 2020, by the French Patent Office as the International Searching Authority for International Application No. PCT/FR2019/052799.

*Primary Examiner* — Jacob T Minskey
*Assistant Examiner* — Matthew Hoover
(74) *Attorney, Agent, or Firm* — Buchanan Ingersoll & Rooney P.C.

(57) ABSTRACT

Manufacture of a pre-impregnated fibrous material which contains continuous fibers and a thermoplastic matrix, the material being made as a plurality of unidirectional parallel ribbons or sheets, and the method involving a step of pre-impregnating, in dry conditions, N parallel strands divided into X groups of Ni strands, by the thermoplastic matrix in powder form in a tank, $\Sigma Ni=N$ et X 3, one thereof from each series being immersed in the powder, each group of strands running on the same number Y of tensioning parts, and the parallel strands being separated by a spacing at least equal to the width of each strand.

26 Claims, 5 Drawing Sheets

(51) Int. Cl.
*B29B 15/14* (2006.01)
*B29K 101/12* (2006.01)
*B29K 105/10* (2006.01)

(56) References Cited

FOREIGN PATENT DOCUMENTS

| WO | WO-9220521 | * | 11/1992 | | |
|----|------------|---|---------|---|---|
| WO | 2015121583 | A2 | 8/2015 | | |
| WO | 2018115736 | A1 | 6/2018 | | |
| WO | WO-2018115736 | A1 * | 6/2018 | .............. | B01J 8/382 |

* cited by examiner

[Fig. 1]
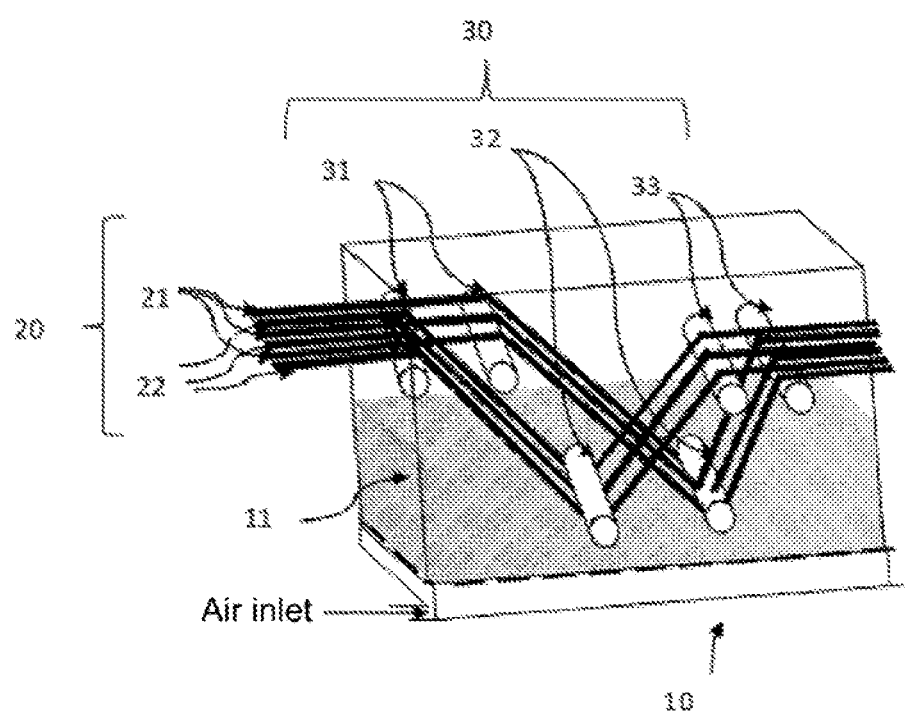

[Fig. 2]
Top view
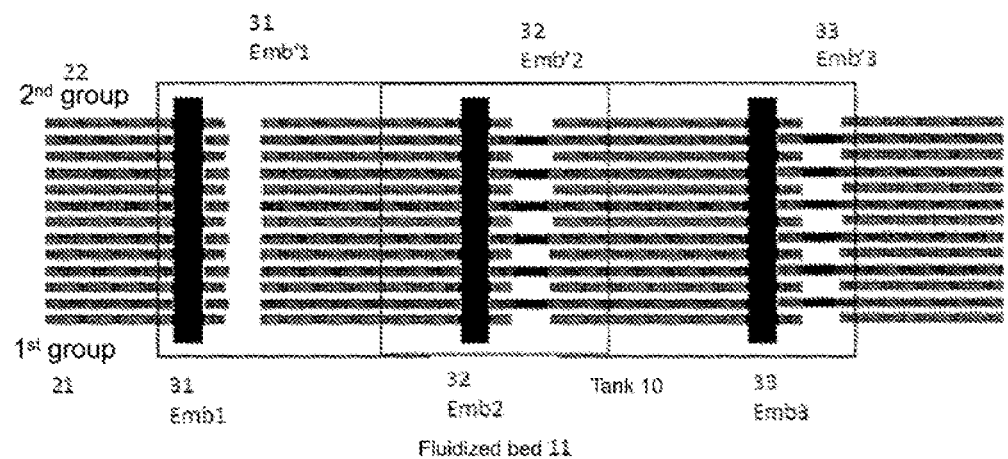
Side view
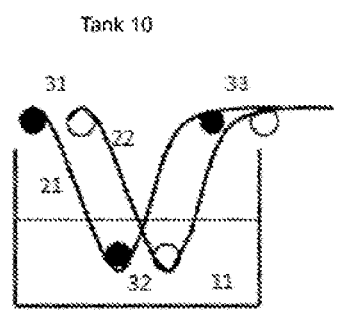

[Fig. 3]
Side view
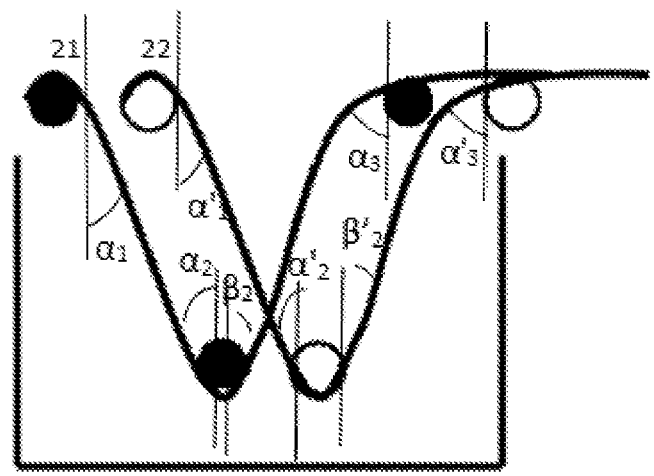

[Fig. 4]
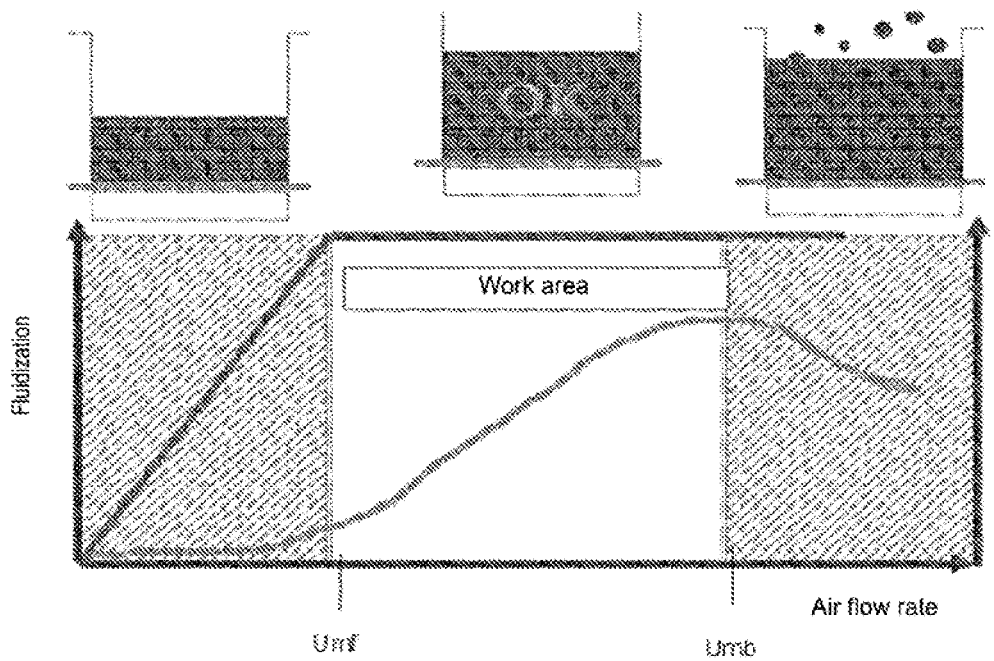

[Fig. 5]
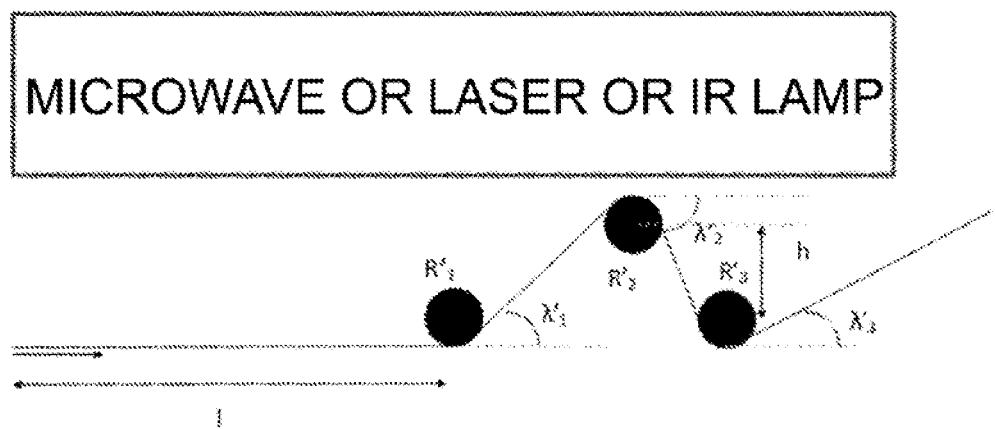

METHOD FOR IMPREGNATING A FIBROUS MATERIAL IN AN INTERPENETRATED FLUIDIZED BED

The present invention relates to a method for manufacturing a fibrous material pre-impregnated with thermoplastic polymer.

More particularly, the invention relates to a method for manufacturing a pre-impregnated fibrous material comprising an impregnation step in powder form for preparing a pre-impregnated fibrous material, in particular in an interpenetrated fluidized bed, in order to obtain ribbons of pre-impregnated fibrous material with calibrated dimensions, usable directly to manufacture three-dimensional composite parts.

The functional principle of the fluidized bed of powder leads to many problems well known to a person skilled in the art. Indeed, the latter knows that any element introduced into a bed of powder in fluidization will disturb the flow of fluidizing gases and therefore the flows of powder. In particular, it is known to those skilled in the art that the introduction of a "through" element (that is to say being partially immersed in the powder in fluidization and partially outside this powder fluidized bed) will act substantially as a screen for the passages of fluidizing gas in the vicinity of this through element. As a result, this unfavorable passage of fluidization gas does not make it possible to maintain a constant concentration of powder locally in an area close to this disturbance of the gas flows. This disturbance, which can be managed and controlled for a fiber strand or even several fiber strands separated by a certain distance, is not easily and stably controlled for a sheet of fiber strands bonded to each other. Thus, when assembling fiber strands before or at the level of the fluidized bed, there is generally an inhomogeneity of powder being carried by the sheet of strands; the powder content being generally lower on the fiber strands located at the center of the sheet.

International application WO 2018/115736 discloses a process for impregnating several strands in parallel in a same fluidized bed, by means of a series of starting pieces; taking care to keep spacing, even a minimum spacing, between the strands.

However, one of the shortcoming of this method lies in the total width of the impregnation line, especially if it is desired to multiply the strands in parallel in order to improve the productivity of the line. This maximum width is induced not only by the width of each fiber strand in the fluidization bath but also by the interstrand spacing necessary to avoid disturbing the fluidization of a fiber too close to its close neighbor. In the most disturbed cases, it is possible to double the width of the impregnation line because of this interstrand spacing.

JP H07 40341 discloses a process for impregnating a fiberglass fibrous material with vinyl chloride in powder form, the said fibrous material being separated into two groups, each group circulating separately on two starting pieces and the two groups being joined on the third starting piece. However, because of the configuration of the starting pieces, the two groups of strands do not have the same residence time in the tank and, therefore, cannot be impregnated in the same way.

The manufacture of these tapes or sheets of impregnated fiber strands requires the unidirectionality of the fibers in the final material to be kept in order to obtain the best performance, in particular mechanical performance of the material; and therefore to avoid the misalignment of the reinforcing fibers, in particular during or after the impregnation step with the dry powder. However, the interstrand spacing necessary during this step of impregnation with the dry powder, so as not to disturb the fluidization of the powder too much, makes it necessary to bring together until contact the different fiber strands impregnated to form the sheet. In the case of the use of a fluid bed, this bringing together can take place during the step of impregnation with the powder, just after this step, or at the exit of the tank containing the fluidized bed, or even after the step of melting the powder and impregnating the fibers with the molten resin. In most cases, it will be necessary to deflect the axes of travel of the fiber strands in order to force them to move closer together, all the more so as the interstrand spacing in the tank has been significant. By doing so, the fibers are oriented at a particular angle different from the angle 0 corresponding to their initial orientation followed on their axis of travel in the impregnation process. A misalignment of the fibers in the (horizontal) plane and/or out of the (vertical) plane of the sheet of fiber strand may result from this induced angle, this misalignment becoming fixed during cooling of the thermoplastic resin and no longer being able to be corrected subsequently.

The invention therefore aims to address at least one of the shortcomings of the background art.

The object of the invention is in particular to propose an innovative method for manufacturing a large number of strands individually impregnated in parallel, comprising the same amount of dry powder, while keeping an installation whose width is close to the width of all the strands impregnated by the powder. Preferably, this impregnation will be homogeneous, that is to say that the powder will be evenly distributed over the entire width of each of said strands. Preferably, the assembly will take place after the impregnation step. Even more preferably, whether it is the parallel manufacture of ribbons from one or more strands or the manufacture of a sheet of strands, the device for impregnating the strands in parallel with the powder will make it possible to maintain the parallelism of the axis of symmetry of the strands impregnated by the powder. In a further optimized manner, these fiber strands are impregnated using an impregnation process in a tank comprising a thermoplastic polymer in powder form, in particular in fluidized bed, the dimensions of which are minimal and nevertheless allowing homogeneous impregnation of the strand and in particular without disturbing a given fiber strand on its nearest neighbors. In an even more optimized manner, the reinforcing fibers will be impregnated to the core with thermoplastic polymer having a low and controlled level of porosity, this impregnation to the core of the fiber strands taking place after the powder melting phase but requiring a homogeneous impregnation of the strands beforehand with the powder.

To this end, the subject of the invention is a method for the manufacture of a pre-impregnated fibrous material comprising a step of pre-impregnation of strands of parallel reinforcing fibers, the said strands being divided into two or more groups of fiber strands which will constitute the ribbons or the final sheet, each group of strands running separately and being interpenetrated on a system of two or more series of starting pieces in the tank comprising a thermoplastic polymer in powder form, in particular in a fluidized bed.

The invention therefore relates to a method for manufacturing a pre-impregnated fibrous material comprising a fibrous material made of continuous fibers and at least one thermoplastic polymer matrix, characterized in that said pre-impregnated fibrous material is made as a plurality of unidirectional parallel ribbons or sheets and in that said method comprises a step of pre-impregnation, in particular homogeneous, of said fibrous material in the form of N parallel strands (20) by said at least one thermoplastic polymer matrix in the form of a powder in at least one tank (10), said pre-impregnation step being carried out in a dry manner in said at least one tank (10), said N parallel strands (20) being divided into X groups consisting of $N_i$ parallel strands in the direction of travel of the strands, $\Sigma N_i=N$ and $X \leq N$, each group of parallel strands running separately by means of X series consisting of Y starting pieces (30) in the at least one tank, with $Y \geq 3$, and of which at least one of said Y starting pieces (30) of each series is at least partially immersed in said powder, each group of strands running on the same number Y of starting pieces (30), said parallel strands being separated from one another in said at least one tank with a spacing at least equal to the width of each strand, at least at said at least partially immersed starting piece, said Y starting pieces (30) of each series in said at least one tank being offset in the direction of travel of the strands by a distance at least greater than the thickness of each strand, the control of the amount of said at least one thermoplastic polymer matrix in said fibrous material being carried out by controlling the residence time of said N strands in the powder, the residence time in the powder being the same for each of said strands, said N strands optionally being joined together out of the powder.

Advantageously, the average volume diameter D50 of the particles of thermoplastic polymer powder is from 30 to 300 μm, in particular from 50 to 200 μm, more particularly from 70 to 200 μm.

The term "width" used in the expressions "tank width" or "line width" denotes the dimension of the element in question (here the tank in the first case and the line in the second case) as measured in the horizontal plane and in cross direction to the direction of travel of the strand in the process.

The expression "parallel strands" means that the axes of symmetry of the strands are parallel to each other.

The expression "residence time in the powder" means the time during which the strand is in contact with said powder in said at least one tank (10).

The expression "in a dry manner" means that the said at least one thermoplastic polymer matrix is in the form of a powder in the said at least one tank and therefore devoid of water or of a solvent in which it would be in suspension or dispersion or emulsion, apart from the humidity content naturally present in the said thermoplastic powder.

Only air or a neutral gas can be present in said at least one tank.

The term "homogeneous" means that the impregnation is uniform over the width of the strands.

In the present description, "fibrous material" refers to an assembly of reinforcing fibers. Before it is shaped, it assumes the form of strands. After it has been shaped, it is in the form of strips (or tapes) made up of one or more strands or ribbons or sheets obtained by assembling a large number of strands, that is to say more than 9 strands.

In one embodiment, the method according to the invention excludes any electrostatic method with deliberate charge.

When the pre-impregnation step is carried out by means of several tanks, two configurations are possible:

The tanks are located in the longitudinal alignment of the strands or the tanks are superimposed.

In one embodiment, the at least one tank (10) corresponds to the at least one fluidized bed (11).

In an advantageous embodiment, the pre-impregnation step is carried out by means of a single tank (10).

In an advantageous embodiment, the pre-impregnation step is carried out by means of a single tank (10) comprising a fluidized bed (11).

In another embodiment, said pre-impregnation step is carried out in a tank by spraying with a spray gun.

The inventors have therefore unexpectedly found that the division of the strands into several groups of individualized parallel strands, each group of individualized parallel strands running over a system of series of starting pieces, the number of series of starting pieces corresponding to the number of groups of strands, with a single group running over a single series of starting pieces and the different groups being interpenetrated with each other, while controlling the residence time, allowed homogeneous pre-impregnation and made it possible, in a second step after melting the powder, to obtain strands impregnated to the core with a low porosity level and controlled in each strand without the need to increase the width of the tank comprising the impregnation powder.

In other words, the inventors have found that the division of the strands into several groups of parallel strands, while generating a sufficient space between each fiber strand belonging to a given group, the different groups being interpenetrated with each other, made it possible not to disturb the fluidization of the powder and therefore to ensure that each of the strands does not undergo the influence of its closest neighbors, while controlling the residence time in the powder of each strand and therefore making it possible for the powder content to be constant from one strand to another.

The use of this system makes it possible in particular:

To generate a sufficient space between each fiber strand belonging to a given group so as not to disturb the fluidization of these strands and without being influenced by its closest neighbors, Not to oversize the fluidization tank, particularly in width, and therefore to optimize the overall width of the impregnation line, To better regulate the fluidization throughout the fluidization tank (better local homogeneity of the flow at any point of the tank) making it possible to obtain a constant and homogeneous level of impregnation for each strand and therefore a uniformly impregnated sheet.

These systems also advantageously make it possible to obtain ribbons or a sheet of fiber strands close to one another without having to deviate them from their axis of travel, the fiber strands interpenetrating without touching one another after the last point of contact with the starting pieces in the tank.

Polymer Matrix

Thermoplastic, or thermoplastic polymer, refers to a material that is generally solid at ambient temperature, which may be semi-crystalline or amorphous, and that softens during a temperature increase, in particular after passage by its glass transition temperature (Tg) and flows at a higher temperature when it is amorphous, or that may exhibit a sharp transition upon passing its so-called melting temperature (Tm) when it is semi-crystalline, and becomes solid again when the temperature decreases below its crystallization temperature (for semi-crystalline) and below its glass transition temperature (for an amorphous).

The Tg and Tm are determined by differential scanning calorimetry (DSC) according to standard 11357-2:2013 and 11357-3:2013, respectively.

As for the polymer making up the impregnation matrix for the fibrous material, it is advantageously a thermoplastic polymer or a mixture of thermoplastic polymers. This polymer or mixture of thermoplastic polymers is milled in powder form, so that it can be used in a device such as a tank, in particular in a fluidized bed.

The device in tank form, in particular in a fluidized bed, may be open or closed.

Optionally, the thermoplastic polymer or blend of thermoplastic polymers further comprises carbon-based fillers, in particular carbon black or carbon-based nanofillers, preferably selected from among carbon nanofillers, in particular graphenes and/or carbon nanotubes and/or carbon nanofibrils or their blends. These fillers make it possible to conduct electricity and heat, and therefore allow improving the lubrication of the polymer matrix when it is heated.

Optionally, said thermoplastic polymer comprises at least one additive, in particular selected from among a catalyst, an antioxidant, a heat stabilizer, a UV stabilizer, a light stabilizer, a lubricant, a filler, a plasticizer, a flame retardant, a nucleating agent, a chain extender and a dye, or a mixture thereof.

According to another variant, the thermoplastic polymer or mixture of thermoplastic polymers can further comprise liquid crystal polymers or cyclized polybutylene terephthalate, or mixtures containing the latter, such as the CBT100 resin marketed by CYCLICS CORPORATION. These compounds in particular make it possible to fluidify the polymer matrix in molten state, for better penetration to the core of the fibers. Depending on the nature of the polymer, or of the mixture of thermoplastic polymers, used to implement the impregnation matrix, notably the melting point thereof, one or another of these compounds will be chosen.

The thermoplastic polymers going into the makeup of the impregnation matrix of the fibrous material can be selected from:
- the polymers and copolymers from the family of aliphatic, cycloaliphatic or semi-aromatic polyamides (PA) (also called polyphthalamides (PPA)),
- polyureas, in particular aromatic polyureas,
- polymers and copolymers from the family of acrylics such as polyacrylates, and more particularly polymethyl methacrylate (PMMA) or derivatives thereof,
- polymers and copolymers from the poly aryl ether ketone (PAEK) family like poly(ether ether ketone) (PEEK), or poly(aryl ether ketone ketones) (PAEKK) like poly (ether ketone ketone) (PEKK) or derivatives thereof,
- aromatic polyether-imides (PEI),
- polyarylsulfides, in particular polyphenyl sulfides (PPS),
- polyarylsulfides, in particular polyphenylene sulfones (PPSU),
- polyolefins, in particular polypropylene (PP);
- polylactic acid (PLA),
- polyvinyl alcohol (PVA),
- fluorinated polymers, in particular polyvinylidene fluoride (PVDF), polytetrafluoroethylene (PTFE) or polychlorotrifluoroethylene (PCTFE),
- and mixtures thereof.

Advantageously, when said thermoplastic polymer is in mixture, it is added to the tank in powder form obtained beforehand by dry blend or compound or directly in the tank in dry blend form.

Advantageously, it is added in powder form obtained beforehand by dry blend or directly in the tank in dry blend form and the mixture is a mixture of PEKK and PEI.

Advantageously, when said polymer is a mixture of two polymers P1 and P2, the proportion by weight of polymer P1 and P2 is from 1-99% to 99-1%.

Advantageously, the PEKK/PEI mixture is from 90-10% to 60-40% by weight, in particular from 90-10% to 70-30% by weight.

The thermoplastic polymer can correspond to the final non-reactive polymer that will impregnate the fibrous material or to a reactive pre-polymer, which will also impregnate the fibrous material, but which may react with itself or with another prepolymer, depending on the chain end carried by said prepolymer, after impregnation, or with a chain extender and in particular during heating at a heating calendar.

According to a first possibility, said pre-polymer can comprise or be constituted of at least one carrier reactive pre-polymer (polyamide) on the same chain (that is to say, on the same pre-polymer), with two terminal functions X' and Y' that are respectively co-reactive functions relative to one another by condensation, more specifically with X' and Y' being amine and carboxy or carboxy and amine, respectively. According to a second possibility, said pre-polymer can comprise or be constituted of at least two polyamide pre-polymers that are reactive relative to one another and each respectively carry two identical terminal functions X' or Y' (identical for same pre-polymer and different between the two pre-polymers), said function X' of a pre-polymer being able to react only with said function Y' of the other pre-polymer, in particular by condensation, more specifically with X' and Y' being amine and carboxy or carboxy end amine, respectively.

According to a third possibility, said pre-polymer can comprise or be constituted of at least one pre-polymer of said thermoplastic polyamide polymer, carrying n terminal reactive functions X, selected from among: —NH2, —CO2H and —OH, preferably NH2 and —CO2H with n being 1 to 3, preferably 1 to 2, more preferably 1 or 2, more particularly 2 and at least one Y-A'-Y chain extender, with A' being a hydrocarbon biradical, of non-polymeric structure, carrying 2 identical Y terminal reactive functions, reactive by poly-addition with at least one X function of said prepolymer a1), preferably of molecular mass less than 500, more preferably less than 400.

The number-average molecular weight Mn of said final polymer of the thermoplastic matrix is preferably in a range from 10000 to 40000, preferably from 12000 to 30000. These Mn values may correspond to inherent viscosities greater than or equal to 0.8, as determined in m-cresol according to standard ISO 307:2007 but by changing the solvent (use of m-cresol instead of sulfuric acid and the temperature being 20° C.).

Said reactive prepolymers, according to the two options given above, have a number-average molecular weight Mn ranging from 500 to 10000, preferably from 1000 to 6000, in particular from 2500 to 6000.

The Mn are determined in particular by calculation from the rate of the terminal functions determined by potentiometric titration in solution and the functionality of said pre-polymers. The masses Mn can also be determined by steric exclusion chromatography or by NMR.

The nomenclature used to define the polyamides is described in ISO standard 1874-1:2011 "Plastics—Polyamide (PA) molding and extrusion materials—Part 1: Designation", in particular on page 3 (Tables 1 and 2) and is well known to the person skilled in the art.

The polyamide can be a homopolyamide or a co-polyamide or a mixture thereof.

Advantageously, the polymers making up the matrix are selected from polyamides (PA), in particular selected from aliphatic polyamides, in particular PA11 and PA12, cycloaliphatic polyamides, and semi-aromatic polyamides (polyphthalamides) optionally modified by urea groups, and copolymers thereof, polymethyl methacrylate (PPMA) and copolymers thereof, polyether imides (PEI), and poly(phenylene sulfide) (PPS), poly(phenylene sulfone) (PPSU), polyether ketone ketone (PEKK), polyether ether ketone (PEEK), and fluorinated polymers like poly(vinylidene fluoride) (PVDF).

For the fluorinated polymers, it is possible to use a homopolymer of vinylidene fluoride (VDF with formula $CH_2=CF_2$) or a copolymer of VDF comprising, by weight, at least 50% by mass of VDF and at least one other monomer copolymerizable with VDF. The VDF level must be over 80% by mass, even better 90% by mass, to provide good mechanical strength to the structural part, especially when it is subject to thermal and chemical stresses. The co-monomer must be a fluorinated monomer, for example vinyl fluoride.

For structural parts having to withstand high temperatures, aside from fluorinated polymers, according to the invention PAEK (polyaryletherketone) such as poly(ether ketones) PEK, poly(ether ether ketone) PEEK, poly(ether ketone ketone) PEKK, Poly(ether ketone ether ketone ketone) PEKEKK or PA with a high glass transition temperature Tg) are advantageously used.

Advantageously, said thermoplastic polymer is a polymer whose glass transition temperature is such that Tg≥80° C., or a semi-crystalline polymer whose melting temperature Tm≥150° C.

Advantageously, said thermoplastic polymer is:
an aliphatic polyamide selected from polyamide 6 (PA-6), polyamide 11 (PA-11), polyamide 12 (PA-12), polyamide 66 (PA-66), polyamide 46 (PA-46), polyamide 610 (PA-610), polyamide 612 (PA-612), polyamide 1010 (PA-1010), polyamide 1012 (PA-1012), or a mixture thereof or a copolyamide thereof,
a semi-aromatic polyamide, optionally modified with urea units, particularly a semi-aromatic polyamide of formula X/YAr, as described in EP1505099, particularly a semi-aromatic polyamide of formula A/XT in which A is selected from a unit obtained from an amino acid, a unit obtained from a lactam and a unit corresponding to the formula (Ca diamine).(Cb diacid), with a representing the number of carbon atoms of the diamine and b representing the number of carbon atoms of the diacid, a and b each being between 4 and 36, advantageously between 9 and 18, the unit (Ca diamine) being selected from linear or branched aliphatic diamines, cycloaliphatic diamines and alkylaromatic diamines and the unit (Cb diacid) being selected from linear or branched aliphatic diacids, cycloaliphatic diacids and aromatic diacids;
X.T denotes a unit obtained from the polycondensation of a Cx diamine and terephthalic acid, with x representing the number of carbon atoms of the Cx diamine, x ranging from 6 to 36, advantageously from 9 to 18, in particular a polyamide of formula A/6T, A/9T, A/10T or A/11T, A being as defined above, in particular a polyamide PA 6/6T, PA 66/6T, PA 61/6T, PA MPMDT/6T, PA MXDT/6T, PA PA11/10T, PA 11/6T/10T, PA MXDT/10T, PA MPMDT/10T, PA BACT/10T, PA BACT/6T, PA BACT/10T/6T, PA 11/BACT/10T, PA 11/MPMDT/10T and PA 11/MXDT/10T, and block copolymers, in particular polyamide/polyether (PEBA).

T corresponds to terephthalic acid, MXD corresponds to m-xylylene diamine, MPMD corresponds to methylpentamethylene diamine and BAC corresponds to bis(aminomethyl)cyclohexane.

Fibrous Material:

The fibers making up said fibrous material are in particular mineral, organic or plant fibers. The mineral fibers include carbon fibers, glass fibers, basalt fibers, silica fibers, or silicon carbide fibers, for example. The organic fibers include thermoplastic or thermosetting polymer-based fibers, such as semi-aromatic polyamide fiber, aramid fibers or polyolefin fibers, for example. Preferably, they are amorphous thermoplastic polymer-based and have a glass transition temperature Tg greater than the Tg of the thermoplastic polymer or polymer mixture making up the impregnation matrix when the matrix is amorphous or greater than Tm of the thermoplastic polymer or polymer mixture making up the impregnation matrix when the latter is semicrystalline. Advantageously, they are semicrystalline thermoplastic polymer-based and have a melting point Tm greater than the Tg of the thermoplastic polymer or polymer mixture making up the impregnation matrix when the matrix is amorphous or greater than Tm of the thermoplastic polymer or polymer mixture making up the impregnation matrix when the latter is semicrystalline. Thus, there is no melting risk for the organic fibers constituting the fibrous material during the impregnation by the thermoplastic matrix of the final composite. The plant fibers include natural linen, hemp, lignin, bamboo, silk, in particular spider silk, sisal, and other cellulose fibers, in particular viscose. These plant fibers can be used pure, treated or coated with a coating layer, in order to facilitate the adherence and impregnation of the thermoplastic polymer matrix.

The fibrous material can also be a fabric, a braid or woven with fibers.

It can also correspond to fibers with support threads.

These component fibers can be used alone or in mixtures. Thus, organic fibers can be mixed with the mineral fibers in order to be impregnated with thermoplastic polymer and to form the pre-impregnated fibrous material.

The organic fiber strands can have several grammages. They can further have several geometries. The fibers can come in short fiber form, which then make up felts or nonwovens which can come in the form of strips, layers or pieces, or in continuous fiber form, which make up 2D fabrics, braids or strands of unidirectional (UD) or nonwoven fibers. The component fibers of the fibrous material can further assume the form of a mixture of these reinforcing fibers with different geometries. Preferably, the fibers are continuous.

Preferably, the fibrous material is composed of continuous carbon, glass or silicon carbide fibers or mixture thereof, in particular carbon fibers. It is used in the form of a strand or several strands.

In the pre-impregnated materials, also called "ready to use", the polymer or mixture of thermoplastic impregnation polymers is distributed uniformly and homogeneously around the fibers. In this type of material, the thermoplastic impregnation polymer must be distributed as homogeneously as possible within the fibers in order to obtain minimal porosities, that is to say, minimal empty spaces between the fibers. Indeed, the presence of porosities in this type of material can act as stress concentration spots, during mechanical tensile stressing, for example, and which then form crack initiation points of the pre-impregnated fibrous material and mechanically compromise it. A homogeneous distribution of the polymer or mixture of polymers therefore improves the mechanical strength and homogeneity of the composite material formed from these pre-impregnated fibrous materials.

Thus, in the case of so-called "ready to use" pre-impregnated materials, the fiber content in said impregnated fibrous material is from 45 to 65% by volume, preferably from 50 to 60% by volume, in particular from 54 to 60% by volume.

The impregnation level can be measured by image analysis (notably using a microscope or camera or digital camera), from a cross section of the ribbon, by dividing the surface area of the ribbon impregnated by the polymer by the total surface area of the product (impregnated surface area plus surface area of the porosities). In order to obtain a good quality image, it is preferable to coat the ribbon cut in its transverse direction with a standard polishing resin and to polish with a standard protocol allowing the observation of the sample under a microscope with at least 6× magnification.

Advantageously, the porosity level of said pre-impregnated fibrous material is between 0% and 30%, in particular from 1% to 10%, in particular from 1% to 5%.

The porosity level corresponds to the closed porosity level and can be determined either by electron microscopy, or as being the relative deviation between the theoretical density and the experimental density of said pre-impregnated fibrous material as described in the examples section of the present invention.

Impregnation Step:

During the pre-impregnation step in said at least one tank, in particular, said N parallel strands (20) are divided into X groups consisting $N_i$ parallel strands in the direction of travel of the strands, $\Sigma N_i = N$ and $X \leq N$, each group of parallel strands running separately by means of X series consisting of Y starting pieces (30) in said at least one tank, with $Y \geq 3$.

It is quite obvious that the number of tanks depends on the number of strands to be pre-impregnated.

The plurality of tanks may be arranged in the direction of travel of said strands and therefore in the direction of the length. The plurality of tanks may also be arranged by superposing the tanks and therefore in the direction of height.

Whatever the number of tanks present and whatever the arrangement of the plurality of tanks, each strand has an identical residence time in the powder.

When several tanks are present, each tank has the same system of X series consisting of Y starting pieces (30) in said tank, with $Y \geq 3$.

Said N parallel strands (20) are therefore divided or separated into a minimum of X=2 groups and run over a minimum of X=2 series of starting pieces, each series of starting pieces consisting of a minimum of 3 starting pieces.

Advantageously, the number of starting pieces ranges from 3 to 20, more preferably from 3 to 10, even more preferably from 3 to 6.

Advantageously, the number of starting pieces ranges from 3 ((31), (32) to (33)).

There are therefore Y starting pieces per series in the tank, Y ranging from 3 to 20.

Advantageously, X ranges from 2 to 200, preferably from 2 to 50, more preferably from 2 to 10, more preferably from 2 to 5, more preferably equal to 2.

There therefore exists in the tank or tanks X series of starting pieces, X advantageously ranging from 2 to 200, preferably from 2 to 50, more preferably from 2 to 10, more preferably from 2 to 5, more preferably being equal to 2.

Advantageously, the number of starting pieces ranges from 3 to 20, more preferably from 3 to 10, even more preferably from 3 to 6 and X ranges from 2 to 200, preferably from 2 to 50, more preferably from 2 to 10, more preferably from 2 to 5, more preferably equal to 2.

Advantageously, the number of starting pieces ranges from 3 to 6 and X ranges from 2 to 10, more preferably from 2 to 5, more preferably equal to 2.

Advantageously, the number of starting pieces ranges from 3 to 6 and X ranges from 2 to 5, more preferably equal to 2.

Advantageously, only one tank is present.

Advantageously, the tank comprises a fluidized bed.

Advantageously, each starting piece, $Y_m$, of each series in the fluidized bed is situated at the same height with respect to the bottom of the tank.

Advantageously, the Y starting pieces of each series in the fluidized bed are each equidistant from each other.

Advantageously, said Y starting pieces are compression rollers of convex, concave or cylindrical shape, in particular of cylindrical shape.

The said strands (20) are thus divided or separated into X groups. The tank therefore comprises X series of starting pieces and each group of strands passes over the $X_n$ series of starting pieces.

Said strands (20) of each group X penetrate into the fluidized bed and run over at least one of said Y starting pieces of each series at least partially immersed in the powder, with an angle $\alpha_2$ formed between the strand and the normal of said starting piece $Y_m$ ranging from 0° to 89°, preferably 5° to 85°, preferably 5° to 45°, preferably 5° to 30°.

Said starting piece is at least partially immersed in the powder so that the powder can penetrate between the strand and the starting piece on which it runs. Advantageously, said starting piece of each series is totally immersed.

Advantageously, the angles $\alpha_2$ of each group of strands formed between the strand and the normal of said starting piece $Y_m$ at least partially immersed in the powder are identical.

After passing over said at least one of said Y starting pieces of each series at least partially immersed in said powder, each strand (20) emerges from said fluidized bed with an angle $\beta_2$ formed between the strand and the normal of said starting piece $Y_m$ ranging from 0° to 89°, preferably from 5° to 85°, preferably from 5° to 45°, preferably from 5° to 30°.

Advantageously, the angles $\beta_2$ of each group of strands formed between the strand and the normal of said starting piece $Y_m$ at least partially immersed in the powder are identical.

Advantageously, the angles $\alpha_2$ of each group of strands formed between the strand and the normal of said starting piece $Y_m$ at least partially immersed in the powder are identical and the angles $\beta_2$ of each group of strands formed between the strand and the normal of said starting piece $Y_m$ at least partially immersed in the powder are identical.

Advantageously, $\alpha_2 = \beta_2$.

In one embodiment, the residence time in the powder ranges from 0.01 s to 10 s, preferably from 0.1 s to 5 s, and in particular from 0.1 s to 3 s.

The residence time of the fibrous material in the powder is one of the essential factors to the impregnation, in particular homogenous, of said fibrous material.

Below 0.1 s, the impregnation is not good.

Beyond 10 s, the polymer matrix level impregnating the fibrous material is too high and mechanical properties of the pre-impregnated fibrous material will be poor.

In one embodiment, said pre-impregnation step is carried out with spreading of each $N_i$ parallel strands between the entry to the tank and the exit from the tank comprising said fluidized bed.

It is quite obvious that in the case of spreading, the axes of symmetry of the strands remain parallel to each other.

The expression "inlet of the fluidized bed" corresponds to the vertical tangent of the edge of the tank that comprises the fluidized bed.

The expression "outlet of the fluidized bed" corresponds to the vertical tangent of the other edge of the tank that comprises the fluidized bed.

The spreading consists in isolating each filament constituting said strand as much as possible from the other filaments which surround it in the space closest thereto. It corresponds to the transverse spreading of the strand.

In other words, the transverse separation or the width of the strand increases between the entry to the tank comprising the fluidized bed and the exit from the tank comprising the fluidized bed thus allowing a homogenous impregnation.

Advantageously, the percentage of spreading of said strand or strands between the inlet and the outlet of said fluidized bed ranges from 1% to 400%, preferably from 30% to 400%, preferably from 30% to 150%, preferably from 50% to 150%.

The spreading depends on the fibrous material used. For example, the spreading of a material made from carbon fiber is much greater than that of a linen fiber.

The spreading also depends on the number of fibers or filaments in the strand, their average diameter and their cohesion due to the sizing.

Advantageously, said spreading of each $N_i$ parallel strands is carried out at least at the level of one of the starting pieces $Y_m$ (30), in particular at least at the level of said at least one of said $Y_m$ starting pieces of each series at least partially immersed in said powder.

Advantageously, said spreading is obtained with a compression roller of cylindrical shape.

Advantageously, said starting pieces $Y_m$ of each series are identical.

Several starting pieces may be present in the tank outside the fluidized bed before the at least one starting piece at least partially immersed.

In the same way, several starting pieces may be present in the tank outside the fluidized bed after said at least one starting piece at least partially immersed.

In one embodiment, the number m of starting pieces for each series is three, and a first starting piece $Y_1$ (31) for each series being located above said fluidized bed after the entry to the tank (10) and a last starting piece $Y_3$ for each series (33) are located above said fluidized bed before the exit from the tank (10), said at least partially immersed piece (32) being located between the first starting piece $Y_1$ (31) and said last starting piece $Y_3$ for each series (33).

Each group of strands runs on a first starting piece $Y_1$ just after the entry to the tank, and then descends towards the powder forming an angle at $\alpha_1$.

It would not depart from the scope of the invention if the first starting piece $Y_1$ corresponds, respectively, to the edge of the tank entry.

Advantageously, the first starting piece $Y_1$ is discrete from the edge of the tank entry.

Said strands just before entering the tank can be separated from each other or edge to edge, but in the latter case, they are then separated over the width of the first starting piece $Y_1$, situated at the entry of the tank, and over each subsequent starting piece, by a distance such that the strands do not touch each other when the spreading of each strand is maximum.

Advantageously, the distance separating two strands of the same series is at least equal to half a width of a spread strand, in particular a width of a spread strand.

In one embodiment, the angle $\alpha_1$ formed between the strand and the normal of said starting piece $Y_1$ ranges from 0° to 89°, preferably from 5° to 85°, preferably from 5° to 45°, preferably from 5° to 30°.

For each series, there is a first starting piece $Y_1$ and, for each group, the angle $\alpha_1$ formed between the strand and the normal of said starting piece $Y_1$ ranges from 0° to 89°, preferably from 5° to 85°, preferably from 5° to 45°, preferably from 5° to 30°.

Advantageously, all the starting pieces $Y_1$ are located at the same height with respect to the bottom of the tank and are offset with respect to each other by at least the thickness of a strand, in particular from 5 mm to 100 mm, in particular from 10 mm to 50 mm.

Advantageously, all the starting pieces $Y_1$ are equidistant from each other.

Advantageously, the angles $\alpha_1$ formed between the strand and the normal of said starting piece $Y_1$ of each series or group are identical.

Said strands (20) of each group then penetrate into the powder, in particular into the fluidized bed, included in the tank, to a second starting piece $Y_2$ of each series $X_n$.

Said second starting piece $Y_2$ of each series is at least partially immersed in the powder, in particular in the fluidized bed, so that the powder can penetrate between the strand and the starting piece on which it runs.

Advantageously, said starting piece of each series is totally immersed.

For each series, there is thus a second starting piece $Y_2$ and, for each group, said strands penetrate with an angle $\alpha_2$ formed between the strand and the normal of said starting piece $Y_2$ ranging from 0° to 89°, preferably from 5° to 85°, preferably from 5° to 45°, preferably from 5° to 30°.

Said starting piece is at least partially immersed in the powder so that the powder can penetrate between the strand and the starting piece on which it runs. Advantageously, said starting piece of each series is totally immersed.

Advantageously, all the starting pieces $Y_2$ are located at the same height with respect to the bottom of the tank and are offset with respect to each other by at least the thickness of a strand, in particular from 5 mm to 100 mm, in particular from 10 mm to 50 mm.

Advantageously, all the starting pieces $Y_2$ are equidistant from each other.

Advantageously, the angles $\alpha_2$ of each group of strands formed between the strand and the normal of said starting piece $Y_2$ at least partially immersed in the powder are identical.

Advantageously, the difference in height between the first starting piece $Y_1$ and the second starting piece $Y_2$ ranges from 10 mm to 600 mm, more preferably from 50 to 300 mm.

After passing over said at least one of said $Y_2$ starting pieces of each series at least partially immersed in said powder, each strand (20) emerges from said fluidized bed with an angle $\beta_2$ formed between the strand and the normal of said starting piece $Y_2$ ranging from 0 to 89°, preferably from 5° to 85°, preferably from 5° to 45°, preferably from 5° to 30°.

Advantageously, the angles $\beta_2$ of each group of strands formed between the strand and the normal of said starting piece $Y_2$ at least partially immersed in the powder are identical.

Advantageously, the angles $\alpha_2$ of each group of strands formed between the strand and the normal of said starting piece $Y_2$ at least partially immersed in the powder are identical and the angles $\beta_2$ of each group of strands formed between the strand and the normal of said starting piece $Y_2$ at least partially immersed in the powder are identical.

Advantageously, $\alpha_2 = \beta_2$.

The strands at said second starting piece are interpenetrated with respect to each other.

The term "interpenetrated" means that the strands pass between each other without being in contact with each other.

After passing over the second starting piece, said strands (20) of each group leave the powder, in particular the fluidized bed included in the tank and go up to the exit from the tank up to a third starting piece $Y_3$ of each series $X_n$.

For each series, there is thus a third starting piece $Y_3$ and, for each group, the angle as formed between the strand and the normal of said starting piece $Y_3$ ranges from 0° to 89°, preferably from 5° to 85°, preferably from 5° to 45°, preferably from 5° to 30°.

Advantageously, all the starting pieces $Y_3$ are located at the same height with respect to the bottom of the tank and are offset with respect to each other by at least the thickness of a strand, in particular from 5 mm to 100 mm, in particular from 10 mm to 50 mm.

Advantageously, all the starting pieces $Y_3$ are equidistant from each other.

Advantageously, the angles $\alpha_3$ formed between the strand and the normal of said starting piece $Y_3$ of each series or group are identical.

Advantageously, the difference in height between the second starting piece $Y_2$ and the third starting piece $Y_3$ ranges from 10 mm to 600 mm, more preferably from 50 to 300 mm.

Advantageously, the difference in height between the first starting piece $Y_1$ and the second starting piece $Y_2$ ranges from 10 mm to 600 mm, more preferably from 50 to 300 mm and the difference in height between the second starting piece $Y_2$ and the third starting piece $Y_3$ ranges from 10 mm to 600 mm, more preferably from 50 to 300 mm.

It would not depart from the scope of the invention if the third starting piece $Y_3$ corresponded to the edge of the tank exit.

Advantageously, the third starting piece $Y_1$ is discrete from the entry edge of the tank.

In one embodiment, all the starting pieces $Y_1$ are located at the same height with respect to the bottom of the tank, and all the starting pieces $Y_2$ are located at the same height with respect to the bottom of the tank, and all the starting pieces $Y_3$ are located at the same height with respect to the bottom of the tank, and each starting piece $Y_1$, $Y_2$ and $Y_3$ are respectively offset with respect to each other by at least the thickness of a strand, in particular from 5 mm to 100 mm, in particular from 10 mm to 50 mm.

Advantageously, all the starting pieces $Y_1$, $Y_2$ and $Y_3$ are equidistant from each other.

Advantageously, the angles $\alpha_1$, $\alpha_2$, $\beta_2$, and $\alpha_3$ formed between the strand and the normal of said starting piece $Y_1$, $Y_2$ and $Y_3$ of each series or group are identical.

Each group of strands runs separately and each strand is interpenetrated with respect to each other. The strands may be separated on a one out of two basis, but it is quite obvious that all solutions are possible, for example on a two out of three basis.

Advantageously, they are separated on a one strand out of two basis.

It is also quite obvious that based on the parity at the origin or not of the N parallel strands or of the parity, the number of strands $N_i$ may not be identical on each series $X_n$, and therefore on each roller $Y_1$ or (31) as well as $Y_2$ or (32) or $Y_3$ (33).

For example, if N=50 strands divided into 5 groups and therefore 5 series of strands, there may be $N_i$=10 strands per group and therefore per series, but it is also possible to envisage a configuration of 4 groups of $N_i$=12 strands and a group of $N_i$=2 strands.

Similarly, if N=51 strands divided into 5 groups, there may be $N_i$=10 strands per group for 4 groups, the latter then comprising $N_i$=11 strands.

Advantageously, each strand comprises from $N_i$-1 to $N_i$+1 strands where $N_i$ is the integer part of N/X.

There can therefore be any configuration providing that each strand has an identical residence time in the powder.

However, whatever the configuration, $\Sigma N_i$=N and X≤N.

According to one embodiment, the present invention relates to a method as defined above characterized in that a single thermoplastic polymer matrix is used and the thermoplastic polymer powder is fluidizable.

The term "fluidizable" means that the air flow rate applied to the fluidized bed is between the minimum fluidization flow rate (Umf) and the minimum bubbling flow rate (Umf) as shown in FIG. 4.

Below the minimum fluidization flow rate, there is no fluidization, the polymer powder particles fall into the bed and are no longer in suspension, and the method according to the invention cannot operate.

Above the minimum bubbling flow rate, the powder particles fly away and the constant composition of the fluidized bed can no longer be kept constant.

Advantageously, the volume diameter D90 of the particles is from 50 to 500 μm, advantageously from 120 to 300 μm.

Advantageously, the volume diameter D10 of the particles is from 5 to 200 μm, advantageously from 35 to 100 μm.

Advantageously, the volume diameter of the particles of powder is in the ratio D90/D10, or from 1.5 to 50, advantageously from 2 to 10.

Advantageously, the average volume diameter D50 of the particles of thermoplastic polymer powder is from 30 to 300 μm, in particular from 50 to 200 μm, more particularly from 70 to 200 μm.

The volume diameters of the particles (D10, D50 and D90) are defined according to standard ISO 9276:2014.

The "D50" corresponds to the average diameter by volume, that is to say, the value of the particle size that divides the examined population of particles exactly in half.

The "D90" corresponds to the value at 90% of the cumulative curve of the particle size distribution by volume.

The "D10" corresponds to the size of 10% of the volume of the particles.

According to another embodiment of the method according to the invention, a creel is present before the tank comprising a fluidized bed to control the tension of the strand(s) at the inlet of the tank comprising a fluidized bed.

Heating Step

In another embodiment, the present invention relates to a method as defined above characterized in that it further comprises at least one step of heating the thermoplastic matrix allowing said thermoplastic polymer to be melted or kept in melt condition after pre-impregnation, the at least one heating step being carried out by means of at least one heat-conducting or non-heat-conducting starting piece (E) and at least one heating system, with the exception of a heating calendar, said strand or strands being in contact with part or all of the surface of said at least one starting piece (E) and partially or totally running over the surface of said at least one starting piece (E) at the heating system.

A first heating step can be immediately consecutive to the pre-impregnation step or else other steps can take place between the pre-impregnation step and the heating step.

Nevertheless, the first step of implementation by a heating system provided with at least one starting piece (E) does not correspond to a heating calendar, and is always done before the calendaring step, which is necessary to smooth and shape the ribbon.

Advantageously, said first heating step immediately follows the pre-impregnation step. The expression "immediately consecutive" means that there is no intermediate step between the pre-impregnation step and said heating step.

Advantageously, a single heating step is done, immediately following the pre-impregnation step.

Advantageously, said at least one heating system is selected from an infrared bulb, a UV bulb and convection heating if the starting piece is heat conducting.

The fibrous material being in contact with the supporter(s) and the heating system, and the supporter being conductive, the heating system therefore also works by conduction.

Advantageously, said at least one heating system is chosen from an infrared bulb.

Advantageously, if the starting piece is non-heat-conducting, said at least one heating system is selected from microwave heating, laser heating and High Frequency (HF) heating.

The non-heating and non-heat-conducting supporting part (E) does not absorb at the wavelength of the microwave, laser or HF heating system.

Advantageously, said at least one heating system is selected from microwave heating.

Advantageously, said at least one starting piece (E) is a compression roller R'i with a convex, concave or cylindrical shape.

It should be noted that the compression rollers corresponding to the starting pieces (E) and those used for the pre-impregnation step can be identical or different whether in terms of the material or shape and its characteristics (diameter, length, width, height, etc., depending on the shape).

The convex shape is favorable to the spreading, while the concave shape is unfavorable to the spreading, although it nevertheless occurs.

The at least one supporting part (E) can also have an alternating convex and concave shape. In this case, the passage of the strand over a convex compression roller causes the spreading of said strand, then the passage of the strand over a concave compression roller causes the retraction of the strand, and so forth, making it possible, if needed, to improve the homogeneity of the impregnation, in particular to the core.

The expression "compression roller" means that the strand that passes bears partially or totally on the surface of said compression roller, which causes the spreading of said strand.

The rollers can be free (rotating) or stationary.

They can be smooth, striated or grooved.

Advantageously, the rollers are cylindrical and striated. When the rollers are striated, two striations can be present in opposite directions from one another starting from the center of said roller, thus allowing the separation of the strands toward the outside of the roller or in opposite directions from one another starting from the outside of said roller, thus making it possible to bring the strands back toward the center of the roller.

A first spreading of the strand occurs at said starting pieces during the pre-impregnation step due to the partial or complete travel of said strand over said starting piece(s) and a second spreading occurs during the heating step, at said compression rollers corresponding to the starting pieces (E) due to the partial or complete travel of said strand over said starting piece(s) (E). This second spreading is preceded, during the passage of the strand in the heating system, before its partial or complete passage over said supporting part(s) (E), by a retraction of the strand due to the melting of the polymer on said strand.

This second spreading, combined with the melting of said polymer matrix by the heating system and the retraction of the strand, make it possible to homogenize the pre-impregnation and thus to finish or to perfect the impregnation and to thus have an homogenous impregnation if it was not so as to have a high fiber rate by volume, in particular constant in at least 70% of the volume of the strip or ribbon, in particular in at least 80% of the volume of the strip or ribbon, in particular in at least 90% of the volume of the strip or ribbon, more particularly in at least 95% of the volume of the strip or ribbon, as well as to decrease the porosity.

The spreading depends on the fibrous material used. For example, the spreading of a material made from carbon fiber is much greater than that of a linen fiber.

The spreading also depends on the number of fibers in the strand, their average diameter and their cohesion due to the sizing.

The diameter of said at least one compression roller (starting piece (E)) ranges from 3 mm to 100 mm, preferably from 3 mm to 20 mm, in particular from 5 mm to 10 mm.

Below 3 mm, the deformation of the fiber caused by the compression roller is too great.

Advantageously, the compression roller is cylindrical and not ribbed, and is in particular metallic.

Advantageously, said at least one starting piece (E) is made up of at least 1 cylindrical compression roller.

Advantageously, said at least one starting piece (E) is made up of 1 to 15 cylindrical compression rollers (R'1 to R'15), preferably 3 to 15 compression rollers (R'3 to R'15), in particular 6 to 10 compression rollers (R'6 to R'10).

It is clear that irrespective of the number of supporting parts (E) present, they are all located or comprised in the environment of the heating system, that is to say, they are not outside the heating system.

According to a first variant, said at least one supporting part (E) is made up of a single compression roller, in particular cylindrical.

Advantageously, said strand(s) form(s) an angle $\lambda'1$ of 0.1 to 89°, in particular of 5 to 75°, in particular of 10 to 45° with a first compression roller R'1 and the horizontal tangent to said compression roller R'1, said strand(s) spreading in contact with said compression roller R'1.

It would not be outside the scope of the invention if the strand were to form an angle with said horizontal tangent to said compression roller R'1 of more than 89° to 360° (modulo 360°).

In the event the strand forms an angle of at least 360° with said horizontal tangent to said compression roller R'1, this means that the strand has performed at least one complete revolution of said roller.

According to a second variant, said at least one supporting part (E) is made up of two compression rollers, in particular cylindrical.

Advantageously, said strand(s) form(s) an angle λ'1 of 0 to 180°, in particular of 5 to 75°, in particular of 10 to 45° with a first compression roller R'1 and the horizontal tangent to said compression roller R'1, said strand(s) spreading in contact with said compression roller R'1.

It would not be outside the scope of the invention if the strand were to form an angle with said horizontal tangent to said compression roller R'1 of more than 180° to 360° (modulo 360°).

In the event the strand forms an angle of at least 360° with said horizontal tangent to said compression roller R'1, this means that the strand has performed at least one complete revolution of said roller.

Advantageously, a second compression roller R'2 is present after said first compression roller R'1, said strand(s) forming an angle λ'2 of 0 to 180°, in particular of 5 to 75°, in particular of 10 to 45° with said second compression roller R'2 and the horizontal tangent to said compression roller R'2, said strand(s) spreading in contact with said second compression roller.

It would not be outside the scope of the invention if the strand were to form an angle with said horizontal tangent to said compression roller R'2 of more than 180° to 360° (modulo 360°).

In the event the strand forms an angle of at least 360° with said horizontal tangent to said compression roller R'2, this means that the strand has performed at least one complete revolution of said roller.

The strand runs below the roller R'1, then above the roller R'2. It is clear that the travel of the strand above the roller R'1, then below the roller R'2 is also an embodiment of the invention.

The roller R'2 can be located above the roller R'1, said roller R'1 preceding said roller R'2.

It is likewise obvious that the roller R'2 can be located below the roller R'1.

The height difference between the roller R'1 and the roller R'2 is greater than or equal to 0.

Advantageously, the height difference between the roller R'1 and the roller R'2 ranges from 1 to 20 cm, preferably from 2 to 15 cm, and in particular from 3 to 10 cm.

Advantageously, the two rollers are at the same level and have the same diameter, and the height difference is then nil.

The distance between the two rollers ranges from 1 to 20 cm, preferably from 2 to 15 cm, in particular from 3 to 10 cm.

According to a third variant, said at least one starting piece (E) is made up of 3 compression rollers, in particular of cylindrical shape.

Advantageously, said strand(s) form(s) an angle λ'1 of 0.1 to 89°, in particular of 5 to 75°, in particular of 10 to 45° with a first compression roller.

R'1 and the horizontal tangent to said compression roller R'1, said strand(s) spreading in contact with said first compression roller.

It would not be outside the scope of the invention if the strand were to form an angle with said horizontal tangent to said compression roller R'1 of more than 89° to 360° (modulo 360°).

In the event the strand forms an angle of at least 360° with said horizontal tangent to said compression roller R'1, this means that the strand has performed at least one complete revolution of said roller.

Advantageously, the second roller is present after said first roller, said strand(s) forming an angle A'2 of 0 to 180°, in particular of 5 to 75°, in particular of 10 to 45° with the second compression roller R'2 and the horizontal tangent to said compression roller R'2, said strand(s) spreading in contact with said second compression roller.

It would not be outside the scope of the invention if the strand were to form an angle with said horizontal tangent to said compression roller R'2 of more than 180° to 360° (modulo 360°).

In the event the strand forms an angle of at least 360° with said horizontal tangent to said compression roller R'2, this means that the strand has performed at least one complete revolution of said roller.

Advantageously, the third compression roller R'3 is present after said second compression roller R'2, said strand(s) forming an angle λ'3 of 0 to 180°, in particular of 5 to 75°, in particular of 10 to 45° with said third compression roller R'3 and the horizontal tangent to said compression roller R'3, said strand(s) spreading in contact with said third compression roller R'3.

It would not be outside the scope of the invention if the strand were to form an angle with said horizontal tangent to said compression roller R'3 of more than 180° to 360° (modulo 360°).

In the event the strand forms an angle of at least 360° with said horizontal tangent to said compression roller R'3, this means that the strand has performed at least one complete revolution of said roller.

The strand travels below the roller R'1, then above the roller R'2, and next below the roller R'3.

It is clear that the travel of the strand above the roller R'1, then below the roller R'2 and next above the roller R'3 is also an embodiment of the invention.

The three rollers can be at the same level, but advantageously, the roller R'2 is located above the roller R'1, and the roller R'3 is located below the roller R'2, said roller R'1 preceding said roller R'2, which in turn precedes R'3.

All relative geometric positions between the three rollers are possible.

The height difference between the lowest roller and the highest roller is greater than or equal to 0.

Advantageously, the height difference between each of the three rollers ranges from 1 to 20 cm, preferably from 2 to 15 cm, in particular from 3 to 10 cm.

The distance between each of the three rollers is from 1 to 20 cm, preferably from 2 to 15 cm, in particular from 3 to 10 cm.

Advantageously, the roller R'1 precedes the roller R'3 and are at the same level and the roller R'2 is located between the roller R'1 and the roller R'3 and is located above the other two rollers.

FIG. 1 shows an exemplary heating system having three compression rollers.

The length I between the inlet of the heating system and the first roller R'1 is variable based on the polymer used and the travel speed of the strip.

I therefore represents the length sufficient for the polymer to melt, at least partially, particularly completely, at the inlet of the first roller.

In one embodiment, four (4) to fifteen (15) rollers can be present.

In general, the angle(s) $\lambda'4\text{-}i$ (i being from 4 to 15) formed by said strand(s) with the rollers R'4-i is (are) from 0 to 180°, in particular from 5 to 75°, in particular from 10 to 45°.

In general, the height difference between each roller R'i and between the lowest roller and the highest roller is greater than or equal to 0.

Advantageously, the height difference between each of the rollers R'i ranges from 1 to 20 cm, preferably from 2 to 15 cm, in particular from 3 to 10 cm.

In general, the distance between each of the rollers R'i is from 1 to 20 cm, preferably from 2 to 15 cm, in particular from 3 to 10 cm.

Advantageously, the spreading percentage during the heating step between the inlet of the first compression roller R'1 and the outlet of the last compression roller R'i is about 0 to 300%, in particular 0 to 50%.

Advantageously, the spreading percentage during the heating step between the inlet of the first compression roller R'1 and the outlet of the last compression roller R'i is about 1 to 50%.

Advantageously, said thermoplastic polymer is a nonreactive thermoplastic polymer. The heating system therefore allows the melting of said thermoplastic polymer after pre-impregnation, as described hereinabove.

Advantageously, said thermoplastic polymer is a reactive pre-polymer capable of reacting with itself or with another pre-polymer, based on the chain ends carried by said pre-polymer, or even with a chain extender, said reactive polymer optionally being polymerized during the heating step.

Depending on the temperature and/or the passage speed of the strand, the heating system allows the melting of said thermoplastic pre-polymer after pre-impregnation as described hereinabove without polymerization of said pre-polymer with itself or with a chain extender or of said pre-polymers amongst themselves.

Advantageously, the porosity level of said impregnated fibrous material ranges from 0% to 30%, in particular from 1% to 10%, in particular from 1% to 5%.

A second heating step can be carried out after the calendaring step below.

This second heating step makes it possible to correct any defects, in particular in homogeneity, that may remain after the first heating step.

It is done with the same system as for the first step.

Advantageously, the heating system of this second step is made up of two rollers.

Optionally, said pre-impregnation and impregnation steps are completed by a step for molding in a nozzle regulated at a constant temperature, said molding step being done before said calendaring step. Optionally, this nozzle is a crosshead-die extrusion nozzle and makes it possible to cover said single strand or said plurality of parallel strands after impregnation by the powder, said covering step being done before said calendaring step, with a molten thermoplastic polymer, which may be identical to or different from said pre-impregnation polymer, said molten polymer preferably being of the same nature as said pre-impregnation polymer.

To that end, a covering device is connected to the outlet of the heating system that may include a covering crosshead-die head, as is also described in patent EP0406067. The covering polymer may be identical to or different from the polymer powder in the tank. Preferably, it is of the same nature. Such covering makes it possible not only to complete the impregnation step of the fibers in order to obtain a final volume rate of polymer in the desired range and to prevent the presence, on the surface of the impregnated strand, of a fiber level that is locally too high, which would be detrimental to the welding of the tapes during the manufacturing of the composite part, in particular to obtain "ready to use" fibrous materials of good quality, but also to improve the performance of the obtained composite material.

Shaping Step

Optionally, a step for shaping of the strand or said parallel strands of said impregnated fibrous material is done.

A calendaring system as described in WO 2015/121583 can be used.

Advantageously, it is done by calendaring using at least one heating calendar in the form of a single unidirectional ribbon or sheet or a plurality of parallel unidirectional ribbons or sheets with, in the latter case, said heating calendar including a plurality of calendaring grooves, preferably up to 200 calendaring grooves, in accordance with the number of said ribbons and with a pressure and/or separation between the rollers of said calendar regulated by a closed-loop control system.

This step is always done after the heating step if there is only one or between the first heating step and the second heating step when the two coexist.

Advantageously, the calendaring step is done using a plurality of heating calendars, mounted in parallel and/or in series relative to the passage direction of the fiber strands.

Advantageously, said heating calendar(s) comprise(s) an integrated induction or microwave heating system, preferably microwave, coupled with the presence of carbon fillers in said thermoplastic polymer or mixture of thermoplastic polymers.

According to another embodiment, a belt press is present between the heating system and the calendar.

According to still another embodiment, a heating nozzle is present between the heating system and the calendar.

According to another embodiment, a belt press is present between the heating system and the calendar and a heating nozzle is present between the belt press and the calendar.

Advantageously, the step for shaping said parallel strand (s) of said impregnated fibrous material, by calendaring using at least one heating calendar in the form of a single unidirectional ribbon or sheet or a plurality of parallel unidirectional ribbons or sheets with, in the latter case, said heating calendar including a plurality of calendaring grooves, preferably up to 300 to calendaring grooves, in accordance with the number of said ribbons and with a pressure and/or separation between the rollers of said calendar regulated by a closed-loop control system.

Advantageously, the calendaring step is done using a plurality of heating calendars, mounted in parallel and/or in series relative to the passage direction of the fiber strands.

Advantageously, said heating calendar(s) comprise(s) an integrated induction or microwave heating system, preferably microwave, coupled with the presence of carbon fillers in said thermoplastic polymer or mixture of thermoplastic polymers.

In one embodiment, said heating calendar(s) is (are) coupled to a complementary rapid heating device, located before and/or after said (each) calendar, in particular a microwave or induction heating device coupled with the presence of carbon-based fillers in said polymer or in said mixture of polymers, or an infrared IR or laser heating device or a device for heating by direct contact with another source of heat such as a flame or a hot gas.

In another embodiment, said impregnation step(s) is (are) supplemented by a step of covering said single strand or said plurality of parallel strands after impregnation by the powder, said covering step being carried out before said calendaring step, with a molten thermoplastic polymer, which may be identical to or different from said polymer in powder form in fluidized bed, said molten polymer preferably being of the same nature as said polymer in powder form in fluidized bed, preferably with said covering being effected by crosshead-die extrusion relative to said single strand or said plurality of parallel strands.

According to another aspect, the present invention relates to a unidirectional ribbon or sheet of impregnated fibrous material, in particular a ribbon or sheet wound on a spool, characterized in that it is obtained using a method as defined hereinbefore.

Advantageously, the ribbon or the sheet has a width (I) and a thickness (ep) suitable for deposition by robot in the manufacture of three-dimensional parts, and preferably has a width (I) of at least 5 mm and which can range up to 600 mm, preferably from 50 to 600 mm and even more preferably from 50 to 300 mm.

The robot deposition can be carried out with or without slitting.

Advantageously, the thermoplastic polymer of the ribbon or sheet is a polyamide selected from, in particular, an aliphatic polyamide such as a PA 6, PA11, PA12, PA66, PA46, PA610, PA612, PA 1010, PA1012, PA11/1010 or PA 12/1010 or a semi-aromatic polyamide such as a PA MXD6 and a PA MXD10 or selected from PA 6/6T, a PA 66/6T, a PA 61/6T, a PA MPMDT/6T, a PA MXDT/6T, a PA PA11/10T, a PA 11/6T/10T, a PA MXDT/10T, a PA MPMDT/10T, a PA BACT/10T, a PA BACT/6T, PA BACT/10T/6T, a PA 11/BACT/10T, a PA 11/MPMDT/10T and a PA 11/MXDT/10T, a PVDF, a PEEK, PEKK and a PEI or a mixture thereof.

According to another aspect, the present invention relates to the use of a method as defined hereinbefore, for the manufacture of calibrated ribbons or sheets suitable for the manufacture of three-dimensional composite parts, by the automatic deposition of the said ribbons or sheets by means of a robot.

According to another aspect, the present invention relates to the use of the ribbon or sheet of pre-impregnated fibrous material, as defined above, in the manufacture of three-dimensional composite parts.

Advantageously, said manufacture of said composite parts relates to the fields of transportation, in particular automotive, oil and gas, in particular offshore, gas storage, civil or military aeronautics, nautical, rail; renewable energies, in particular wind energy, tidal energy, energy storage devices, solar panels; thermal protection panels; sports and recreation, health and medical, security and electronics.

According to yet another aspect, the present invention relates to a three-dimensional composite part, characterized in that it results from the use of at least one unidirectional ribbon or sheet of pre-impregnated fibrous material as defined above.

DESCRIPTION OF THE FIGURES

FIG. 1 discloses an example of the pre-impregnation step, without being limited thereto, in a tank comprising a fluidized bed, and in which the N parallel strands (20) are separated into X=2 groups of parallel strands (21) and (22) running parallel separately on two series of starting pieces $Y_m$ (30) each consisting of three starting pieces (m=3: (31), (32) and (33)), the starting pieces (32) being totally immersed in the bed.

FIG. 2 is a top and side view of the example disclosed in FIG. 1.

FIG. 3 is the side view of FIG. 2 in which the angles of the groups of strands with the starting pieces are shown.

FIG. 4 shows the fluidization based on the air flow rate. The air flow rate applied to the fluidized bed must be between the minimum fluidization flow rate (Umf) and the minimum bubbling flow rate (Umf).

FIG. 5 shows a diagram of a heating system according to the invention with three conducting and non-conducting rollers.

EXAMPLES

Comparative Example

Impregnation

The impregnation was carried out as disclosed in WO 2018/115736 on a strand of Toray carbon fiber (FC) 12K T700 31E with a diameter of 7 µm and titration of the fiber at 0.8 g/m with a BACT/10T powder (0.7/1 by weight) having a D50=117 µm (D10=59 µm and D90=204 µm)

Heating Step

The heating system used is that disclosed in FIG. 5, but with nine stationary cylindrical rollers $R'_1$ to $R'_9$ with a diameter of 15 mm, each at the same level.

The speed of advance of the strand is 10 m/min.

The infrared used has a power of 25 kW, the height between the infrared and the axes of the rollers is 15 cm.

The angles $\alpha'_1$ to $\alpha'_9$ are identical and 25°.

The height h is equal to 0.

The length I is 1,000 mm.

The nine rollers are each separated by 43 mm.

Calendering using two calendars mounted in series equipped with an IR of 1 kW each after the heating step.

Example 1

Impregnation: general operating procedure

The invention will be further explained with reference to the example of FIGS. 1 and 2, wherein a single tank comprising a fluidized bed is used, and the N strands are divided into X=2 groups, but it is quite obvious that this example is equally valid regardless of the number of groups X present. In the same way, three starting pieces $Y_m$ (30) per series are present, but it is quite obvious that this example is equally valid regardless of the number of starting pieces $Y_m$ (30) present.

The invention therefore consists in dividing (or separating) the set N of strands present at the tank entry into two groups ($1^{st}$ (21) and $2^{nd}$ (22) groups) (FIG. 2) of N/2 strands if N is an even number or, for example, (N+1)/2 strands ($1^{st}$ group) and (N−1)/2 ($2^{nd}$ group) respectively if N is an odd number.

In top view of the set N of strands at the tank entry, the strands belong alternately to the $1^{st}$ group (21) and then to the $2^{nd}$ group (22).

The fiber strands of the $1^{st}$ group (21) plunge in the direction of the powder in the fluidized bed, after having left a first starting element denoted emb1 (31) by forming an angle $\alpha_1$ with the normal to this starting piece.

The fiber strands of the $2^{nd}$ group plunge in the direction of the powder in the fluidized bed after leaving a first starting piece denoted emb'1, forming an angle $\alpha'_1$ with the normal to this starting piece. The starting pieces emb1 and emb'1 are separated by a distance Demb1-emb'1 at least equal to the thickness of the strand, in particular from 5 mm to 100 mm, in particular from 10 mm to 50 mm.

The fiber strands of the 1$^{st}$ group of fibers (21) then plunge into the fluidized bed of powder until they come into contact with a second starting piece at least partially (totally in FIGS. 1 and 2) in the fluidized bed denoted emb2. The angle formed between each fiber strand and the normal to the starting element at the point of contact is denoted $\alpha_2$.

In the same way, the strands of the 2$^{nd}$ group of fibers (22) then plunge into the fluidized bed of powder until they come into contact with a second starting piece immersed at least partially (totally in FIGS. 1 and 2) in the fluidized bed denoted emb'2. The angle formed between each fiber strand and the normal to the starting piece at the point of contact is denoted $\alpha'2$.

In order to maintain identical paths in terms of travel time, tension of the fiber strands and friction, the starting pieces emb2 and emb'2 are separated by a distance Demb2-emb'2 equal to the distance Demb1-emb'1 and are of the same nature (material, surface, finishing, etc.).

The fiber strands of the 1$^{st}$ group of fibers (21) emerge from the starting piece emb2 with an angle formed between each fiber strand and the normal to the starting piece denoted $\beta_2$, then the strands impregnated with powder emerge from the fluidized bed of powder to come into contact with a last starting piece and denoted emb3. The angle formed between each fiber strand and the normal to the starting element at the point of contact is denoted $\alpha_3$.

In the same way, the fiber strands of the second group of fibers (22) emerge from the starting piece emb'2 with an angle formed between each fiber strand and the normal to the starting piece denoted $\beta'_2$ then the strands impregnated with powder leave the fluidized bed of powder to come into contact with a last starting piece denoted emb'3. The angle formed between each fiber strand and the normal to the starting element at the point of contact is denoted $\alpha'_3$.

In order to maintain identical paths in terms of travel time, tension of the fiber strands and friction, the starting pieces emb3 and emb'3 are separated by a distance Demb3-emb'3 equal to the distance Demb2-emb'2 and therefore Demb1-emb'1 and are of the same nature (material, surface, finishing, etc.).

In order to obtain fiber strands equivalent to one another before the ribbon or sheet is made up, in particular in terms of dimensions (width, thickness) and of the proportion of impregnated polymer as well as of the level of porosities, several parameters must be controlled, some of which are outlined below.

The entry and exit angles of the fibers at the entry and exit starting rollers have a definite impact on the tension generated on the fiber strands and on the amount of powder carried by the fiber strand. It is therefore necessary for the system to be symmetrical on these points.

In the system presented here, this residence time is kept for the two groups of reinforcing fiber strands by immersing in an equivalent manner the two starting systems emb1' and emb2'; these two starting systems further having the same contact surface with the fiber strands on the two systems.

The impregnation carried out according to Example 1 with a 1$^{st}$ group of 3 strands to produce strips 1, 3 and 5, and a 2$^{nd}$ group of 2 strands to produce strips 2 and 4 (identical angles $\alpha'_1$ and $\alpha'_1$ and of 17°, identical angles $\alpha_3$ and $\alpha'_3$ and of 17°, then heating step as in the comparative example) gives comparable results in homogeneity and porosity and with a resin content identical to the impregnation carried out according to the comparative example. Table I below outlines the results obtained.

TABLE I

| | Average BACT/10T (wt %) | Variability (% by weight) |
|---|---|---|
| Strip only (comparative example | 33 | + or − 1.5% |
| Strip #1 | 32.6 | + or − 1.7% |
| Strip #2 | 33.1 | + or − 1.4% |
| Strip #3 | 32.7 | + or − 1.6% |
| Strip #4 | 32.9 | + or − 1.5% |
| Strip #5 | 33 | + or − 1.3% |

The invention claimed is:

1. A method for manufacturing a pre-impregnated fibrous material comprising a fibrous material made of continuous fibers and at least one thermoplastic polymer matrix, wherein said pre-impregnated fibrous material is made as a plurality of unidirectional parallel ribbons or sheets and in that said method comprises a homogeneous pre-impregnation step of said fibrous material in the form of N parallel strands by said at least one thermoplastic polymer matrix in the form of a powder in a tank, said pre-impregnation step being carried out in a dry manner in said tank, said N parallel strands being divided into X groups consisting of Ni parallel strands in the direction of travel of the strands, ΣNi=N and X≤N, X ranging from 2 to 200, each group of parallel strands running separately by means of X series consisting of Y starting pieces in the tank, with Y≥3, and of which at least one of said Y starting pieces of each series is at least partially immersed in said powder, each group of strands running on the same number Y of starting pieces, the at least one thermoplastic polymer matrix is made from:
  the polymers and copolymers from the family of aliphatic, cycloaliphatic or semi-aromatic polyamides (PA) (also called polyphthalamides (PPA)),
  polyureas,
  polymers and copolymers from the family of acrylics,
  polymers and copolymers from the poly aryl ether ketone (PAEK) family like poly(ether ether ketone) (PEEK), or poly(aryl ether ketone ketones) (PAEKK) like poly(ether ketone ketone) (PEKK) or derivatives thereof,
  aromatic polyether-imides (PEI),
  polyarylsulfides,
  polyolefins,
  polylactic acid (PLA),
  polyvinyl alcohol (PVA),
  fluorinated polymers,
  and mixtures thereof,
said parallel strands being separated from one another in said tank with a spacing at least equal to the width of each strand, at least at said at least partially immersed starting piece,
said Y starting pieces of each series in the tank being offset in the direction of travel of the strands by a distance at least greater than the thickness of each strand,
the control of the amount of said at least one thermoplastic polymer matrix in said fibrous material being carried out by controlling the residence time of said N strands in the powder,
the residence time in the powder being the same for each of said strands, said N strands optionally being joined together out of the powder.

2. The method according to claim 1, wherein said tank comprises a fluidized bed.

3. The method according to claim 2, wherein each Ym starting piece of each series in the fluidized bed is located at the same height from the bottom of the tank.

4. The method according to claim 2, wherein the Y starting pieces of each series in the fluidized bed are each equidistant from one another.

5. The method according to claim 2, wherein said Y starting pieces are compression rollers of convex, concave or cylindrical shape.

6. The method according to claim 2, wherein each strand of each group X penetrates into said fluidized bed and runs over at least one of said Y starting pieces of each series at least partially immersed in the powder, with an angle α2 formed between the strand and the normal of said starting piece Ym ranging from 0 to 89°.

7. The method according to claim 6, wherein after running over said at least one of said Y starting pieces of each series at least partially immersed in said powder, each strand of each group X emerges from said fluidized bed with an angle α'2 formed between the strand and the normal of said starting piece Ym ranging from 0 to 89°.

8. The method according to claim 2, wherein the residence time in the powder ranges from 0.01 s to 10 s.

9. The method according to claim 2, wherein said pre-impregnation step is carried out with spreading of each Ni parallel strands between the entry to the tank and the exit from the tank comprising said fluidized bed.

10. The method according to claim 9, wherein said spreading of each Ni parallel strands is carried out at least at one of the starting pieces Ym.

11. The method according to claim 1, wherein the starting pieces Y of each series are identical.

12. The method according to claim 2, wherein m=3 for each series, a first starting piece Y1 for each series being located above said fluidized bed after the entry to the tank and a last starting piece Y3 for each series are located above said fluidized bed before the exit from the tank, said at least partially immersed piece being located between the first starting piece Y1 and said last starting piece Y3 for each series.

13. The method according to claim 2, wherein said piece is totally immersed in said fluidized bed.

14. The method according to claim 2, wherein the fiber level in said pre-impregnated fibrous material ranges from 45 to 65% by volume.

15. The method according to claim 1, wherein a single thermoplastic polymer matrix is used and the thermoplastic polymer powder is fluidizable.

16. The method according to claim 1, wherein it further comprises at least one step of heating the thermoplastic matrix allowing said thermoplastic polymer to be melted or kept in melt condition after pre-impregnation,
the at least one heating step being carried out by means of at least one heat-conducting or non-heat-conducting starting piece (E) and at least one heating system, with the exception of a heating calendar,
said strand or strands being in contact with part or all of the surface of said at least one starting piece (E) and partially or totally running over the surface of said at least one starting piece (E) at the heating system.

17. The method according to claim 1, wherein it additionally comprises a step for shaping said strand or said parallel strands of said impregnated fibrous material, by calendaring using at least one heating calendar in the form of a single unidirectional ribbon or a plurality of parallel unidirectional ribbons or sheets with, in the latter case, said heating calendar comprising a plurality of calendaring grooves, in accordance with the number of said ribbons and with a pressure and/or separation between the rollers of said calendar regulated by a closed-loop control system.

18. The method according to claim 17, wherein the calendaring step is done using a plurality of heating calendars, mounted in parallel and/or in series relative to the passage direction of the fiber strands.

19. The method according to claim 17, wherein said heating calendar(s) comprise(s) an integrated induction or microwave heating system, coupled with the presence of carbon fillers in said thermoplastic polymer or mixture of thermoplastic polymers.

20. The method according to claim 17, wherein said heating calendar(s) is (are) coupled to a complementary rapid heating device, located before and/or after said (each) calendar.

21. The method according to claim 1, wherein said impregnation step(s) is (are) supplemented by a step of covering said single strand or said plurality of parallel strands after impregnation by the powder, said covering step being carried out before said calendaring step, with a molten thermoplastic polymer, which may be identical to or different from said polymer in powder form in fluidized bed.

22. The method according to claim 1, wherein said thermoplastic polymer further comprises carbon-based fillers.

23. The method according to claim 1, wherein said thermoplastic polymer further comprises liquid crystal polymers or cyclized poly(butylene terephthalate), or blends containing these as additives.

24. The method according to claim 1, wherein said at least thermoplastic polymer is selected from:
polyaryl ether ketones (PAEK);
polyaryl ether ketone ketone (PAEKK);
polyarylsulfides;
polyamides (PA);
PEBAs,
polyacrylates;
polyolefins; and
mixtures thereof.

25. The method according to claim 24, wherein said at least one thermoplastic polymer is a polymer whose glass transition temperature is such that Tg≥80° C., or a semi-crystalline polymer whose melting point Tm≥150° C.

26. The method according to claim 1, wherein said fibrous material comprises continuous fibers selected from carbon, glass, silicon carbide, basalt, and silica fibers, natural fibers especially flax or hemp, lignin, bamboo, sisal, silk, or cellulose.

* * * * *